Aug. 12, 1952  R. HAPPE  2,606,947
ELECTRIC MOTOR FOR SANDING TOOLS OR THE LIKE
Filed Oct. 25, 1950  2 SHEETS—SHEET 1
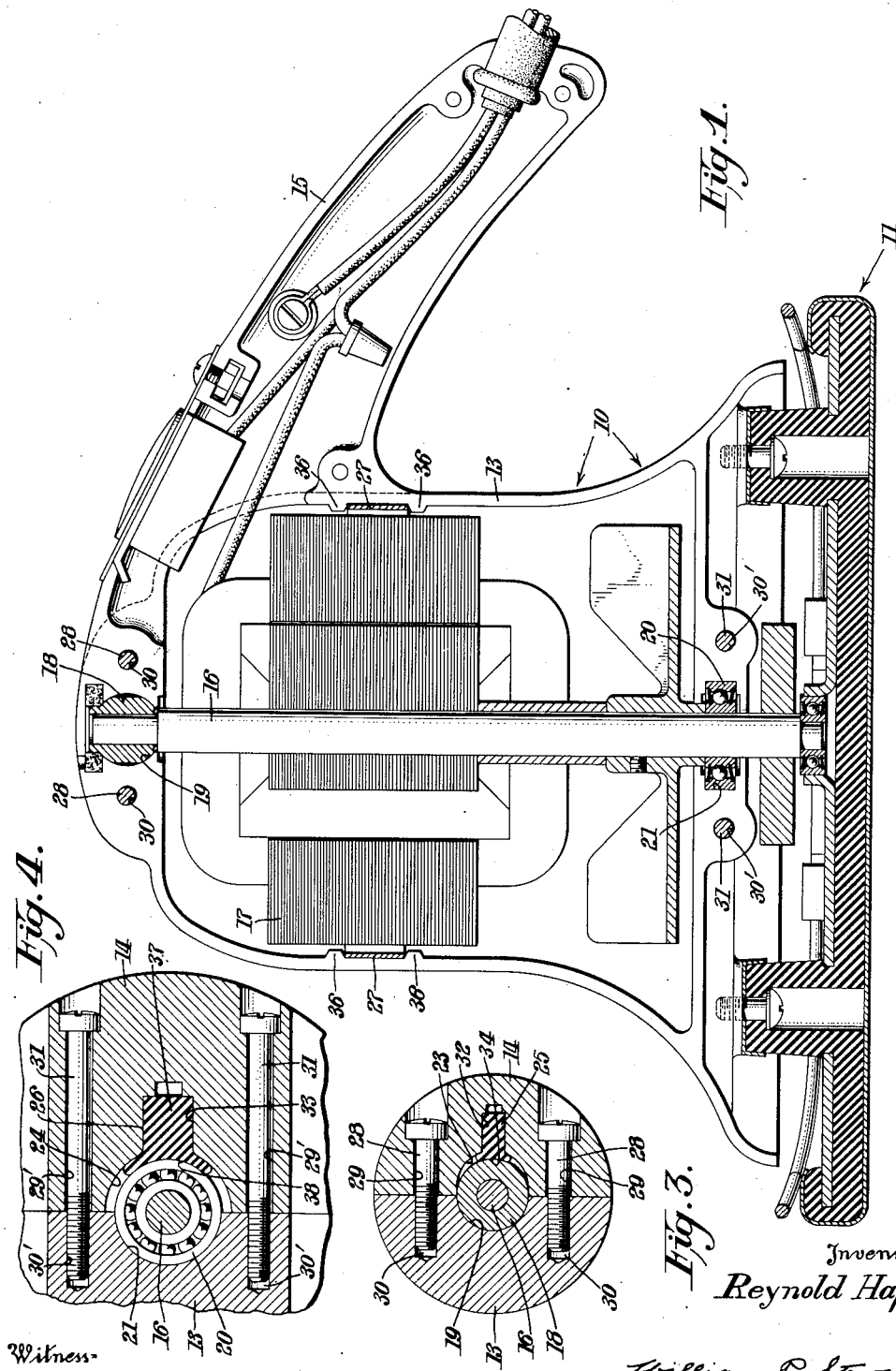
Inventor
Reynold Happe
William P. Stewart
Attorney
Witness
William Martins

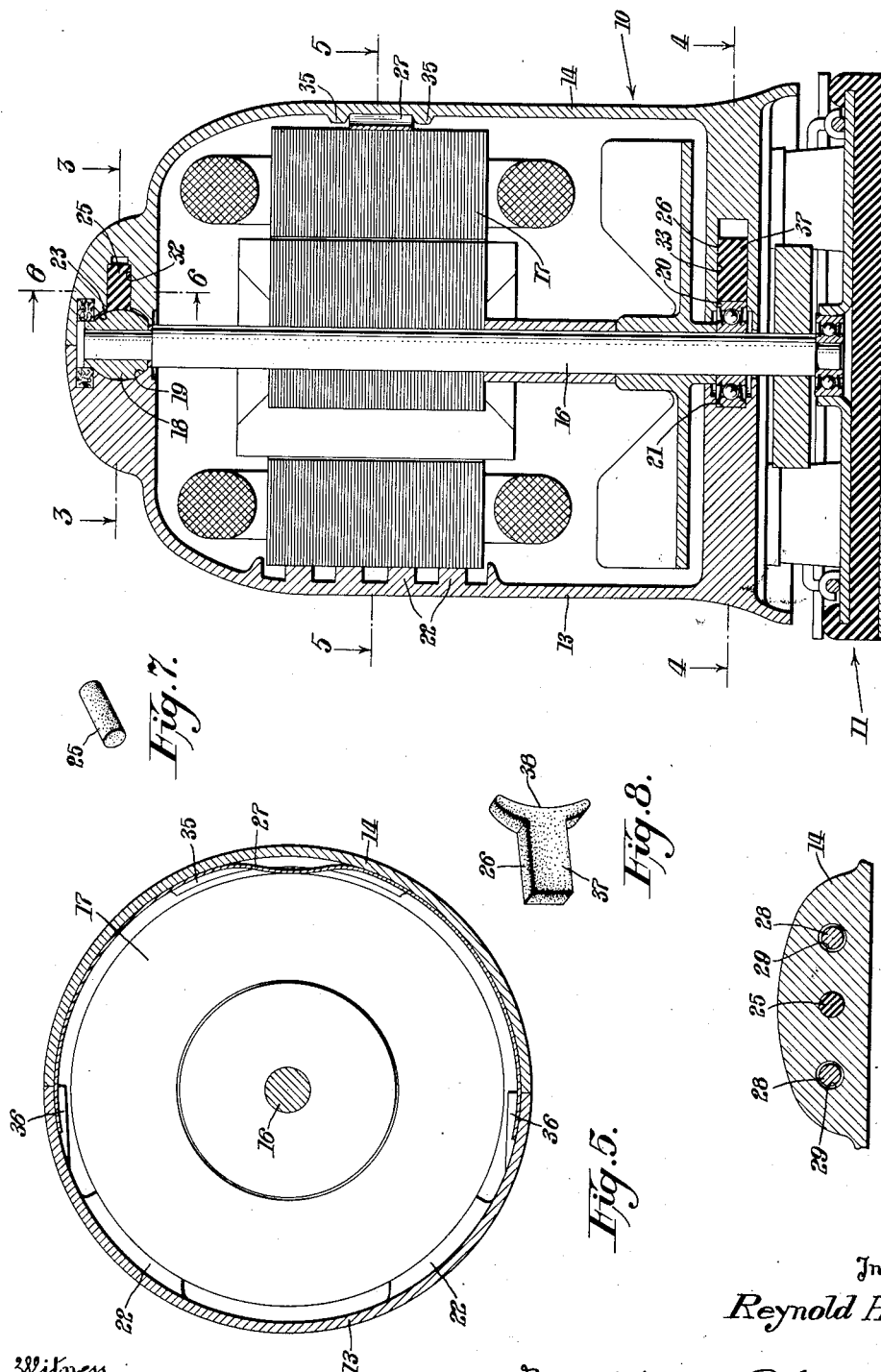

Patented Aug. 12, 1952

2,606,947

UNITED STATES PATENT OFFICE 2,606,947

ELECTRIC MOTOR FOR SANDING TOOLS OR THE LIKE

Reynold Happe, Pittstown, N. J., assignor to The Singer Manufacturing Company, Elizabeth, N. J., a corporation of New Jersey Application October 25, 1950, Serial No. 192,115

2 Claims. (Cl. 172—36)

This invention relates to electric motors and relates more particularly to electric motors for hand-guided sanding or polishing tools.

An object of the present invention is to provide a motor construction which is inexpensive of manufacture.

Another object is to provide a motor bearing construction which will facilitate the manufacture and assembly of motor casings and which, at the same time, will present a most efficient motor from an operation standpoint.

With the above and other objects in view as will hereinafter appear, the invention comprises the devices, combinations, and arrangements of parts hereinafter set forth and illustrated in the accompanying drawings of a preferred embodiment of the invention, and the advantages attained thereby will be readily understood by those skilled in the art.

Fig. 1 represents a longitudinal vertical section through a motor-driven sanding tool in which the present invention is incorporated.

Fig. 2 represents a longitudinal vertical section through the sanding tool, which vertical section is taken at right angles to the section illustrated in Fig. 1.

Fig. 3 represents a sectional view taken substantially along the line 3—3 of Fig. 2.

Fig. 4 represents a sectional view taken substantially along the line 4—4 of Fig. 2.

Fig. 5 represents a sectional view taken substantially along the line 5—5 of Fig. 2.

Fig. 6 represents a sectional view taken substantially along the line 6—6 of Fig. 2.

Figs. 7 and 8 each represents a perspective view of a respective one of the two types of resilient cushions employed in the present invention.

Briefly stated, the present device comprises a hand-guided sanding or polishing tool including a motor housing generally designated by the numeral 10, to the lower portion of which is secured a sanding or polishing head 11 which is adapted to be driven relative to the housing 10 for the purpose of polishing or sanding flat surfaces. More specifically, the head 11 is given a substantially gyratory motion by a motor which is contained within the housing 10.

The present motor housing 10 comprises a two-part casing having a handle projecting from its upper portion and being split longitudinally of itself along a plane containing the axis of motor shaft rotation so as to divide the handle throughout its length. One portion of this casing is designated by the numeral 13 while the other is designated by the numeral 14. Each casing part has projecting therefrom one-half of a hollow handle member which is adapted to be employed for controlling the sanding unit. Referring particularly to Fig. 1, the casing part 13 is illustrated as having one-half of a handle portion 15 projecting therefrom. Although not illustrated in the present drawings, the casing part 14 has a similar one-half handle portion projecting therefrom so that the two half handle portions may be secured together to form an integral hollow handle unit.

A standard type split-phase induction motor is positioned within the housing 10 with a motor rotor shaft 16 disposed in a vertical position and with its longitudinal axis lying in the plane of the housing cleavage. Surrounding the rotor shaft is a conventional cylindrically shaped motor stator 17.

The opposite end portions of the motor rotor shaft 16 are each provided with one of a pair of bearing elements of which an upper element 18 is spherical in shape and is adapted to nest directly in a hemispherical bearing seat 19 provided in the upper portion of the casing half 13. A lower bearing element 20 is cylindrical in shape and it is adapted to nest directly within a semicircular bearing seat 21 provided in the lower half of the casing half 13. With the two bearings 18 and 20 so located within the first half 13 of the housing, the stator 17 is adapted to be seated directly against a plurality of arcuately-shaped ribs 22, 22 provided on the inner cylindrical wall of the casing part 13. For locking the motor in its proper position within the casing part 13, the second half 14 of the two-part housing is provided with an upper hemispherical bearing recess 23 and a lower semicircular bearing recess 24, which recesses are oversize so that they will not normally engage their associated rotor shaft bearing elements 18 and 20. Positioned in a respective one of these oversize bearing recesses 23 and 24 is one of a pair of rubber cushions 25 and 26 which are adapted to engage their associated rotor shaft bearings 18 and 20 so as to bias the bearings into the bearing seats 19 and 21 of the first half of the housing, whenever the two housing parts are clamped together by suitable bolts.

In order to hold the stator 17 in a stationary position, the second half 14 of the two-part housing is provided with an arcuate leaf spring 27 which, when the housing parts are locked together, functions to bias the stator 17 against its associated arcuate ribs 22, 22 which are formed in the first half 13 of the housing. Thus, in the present construction, the bearings 18 and 20, and the stator 17 are held in proper axial alignment by accurately formed seats in the casing part 13, and due to the use of the rubber cushions 25 and 26, the stator and the bearings are held firmly within the part 13 notwithstanding variations or inaccuracies in manufacture or by changes in the other casing part 14 that may occur with the passing of time.

The lower end portion of the motor rotor shaft 16 projects downwardly from and through the housing 10 so as to be operatively connected to the sanding head 11 for the purpose of actuating the same in a manner which is not pertinent to the present invention and thus will not be described herein.

As hereinabove noted, the two-part housing 10 is adapted to be secured together by means of suitable bolts which are best disclosed in Figs. 1, 3 and 4. Referring particularly to Figs. 1 and 3, it will be observed that the housing is provided with upper bolts 28, 28 whose head ends are loosely received within apertures 29, 29 formed in the casing part 14, while the threaded ends of the bolts are mated within threaded apertures 30, 30 formed within the casing part 13. Referring particularly to Fig. 4, the lower portions of the casings are provided with bolt apertures 29', 29' and 30', 30' and bolts 31, 31 in the same manner as the upper portion of the housing. Clearly, therefore, when the bolts are suitably tightened within the threaded apertures, they will function to lock the two casing parts together, thereby to provide a hollow housing with a hollow arm portion projecting therefrom.

Referring particularly to Figs. 2, 3 and 4, it will be observed that the second casing part 14 is provided with an upper cylindrical chamber 32 and a lower rectangular chamber 33 with each chamber communicating with a respective one of the oversize bearing recess 23 and 24. Each one of these chambers is adapted to receive the shank end portion of its associated rubber cushion whose other end or shoe portion extends out of the chamber so as to fit snugly against its associated rotor shaft bearing element. Thus, when the two casing parts are clamped together, as by means of bolts, the shoe end of each rubber cushion will function intimately to contact its bearing element so as to force the same into its bearing seat which is provided in the first casing part 13. Therefore, neither of the two bearing elements 18 and 20 will contact the second casing part 14, but will be fully insulated therefrom by means of the rubber cushions. In constructing the first casing part 13, it is, of course, necessary to maintain relatively close tolerances between the bearing seat portions 19 and 21 and the arcuate ribs 22, 22 against which the stator is to be seated so that when the motor is positioned within this portion of the casing the bearing seats 19 and 21, along with these arcuate ribs 22, will accurately locate the motor.

Referring particularly to Figs. 1, 2 and 5, it will be observed that the leaf spring 27 is maintained within the two-part housing 10 and is prevented from moving lengthwise thereof by means of arcuate ribs 35, 35 which are formed integrally with the casing part 14, and ribs 36, 36 similarly formed on the casing part 13. From this it will be understood that when the two casing parts are mated together with the spring 27 in its proper position, the latter element will function to bias the stator 17 directly against the arcuate rib portions 22 formed in the casing part 13.

Referring to Figs. 2, 3 and 7, the rubber cushion 25 may be formed as a simple cylinder, but, of course, when the two casing parts are tightened together the outer end of the cushion or plug will "flow" about the bearing element 18 so as to form an arcuate shoe portion 34. The other rubber cushion or plug 26 may be formed in a manner similar to the plug 25, but in a preferred form of the invention this plug is formed with a rectangular shank 37 and an enlarged arcuately shaped shoe 38 whose end portions are adapted to be disposed between the bearing element 20 and the wall of the recess 24.

Essentially, however, the two plugs 25 and 26 function in the same manner for each of them is adapted to be deformed upon securing the casing parts together, to the end that the bearing elements 18 and 20 will be biased into their respective seats 19 and 21.

Those skilled in the art will readily appreciate that the present invention makes for a most inexpensive motor construction, for only the first casing part 13 need be accurately machined as the resilient plugs 25 and 26 will compensate for any inaccuracies that may exist in the second casing part 14. Furthermore, with such a bearing construction, the two casing parts 13 and 14 may be quickly bolted together without the necessity of spending time and effort in aligning the two units, for when the fastening bolts are tightened the resilient plugs 25 and 26 and the spring 27 will automatically and accurately seat the bearing elements 18 and 20 and the stator 17 against their associated seats which are formed on the first casing part 13.

Having thus set forth the nature of the invention, what I claim herein is:

1. A motor comprising, a casing divided into first and second parts substantially along a plane containing the axis of motor shaft rotation, a shaft, a stator member surrounding said shaft, a bearing member for each end of said shift, seats formed on the first casing part for engagement by said stator and said bearing members to locate said bearing members and said stator in axial alignment, means for securing the two casing parts together, said second casing part being formed with a pair of recesses therein of which each is disposed so as to receive a portion of a respective one of said bearing members, said recesses each being sufficiently large so as to provide an air gap between its wall and its associated bearing member, a pair of elongated chambers formed radially of and within said second casing part with each chamber communicating with a respective one of said recesses, and a pair of compressible plugs of which each has its one end disposed within a respective one of said chambers while its other end is deformed against one of said bearings by said motor casing securing means.

2. A motor comprising, a casing divided into first and second parts substantially along a plane containing the axis of motor shaft rotation, a shaft, a stator member surrounding said shaft, a bearing member for each end of said shaft, a seat formed on the first casing part for engagement by said stator, a pair of concave seats formed in the first casing part with each snugly receiving therein substantially one-half of a respective one of said shaft bearing members so as to locate said bearing members in axial alignment with said stator, means for securing the two casing parts together, a pair of concave seats formed in said second casing part so that each will receive the remaining one-half portion of a respective one of said bearing members, said last mentioned two seats being larger than the first mentioned seats so that each of the latter will provide an air gap between its wall and its associated bearing member, a pair of elongated chambers formed radially of and within said second casing part with each chamber communicating with a respective one of said latter two seats, and a pair of compressible plugs of which each has its one end disposed and secured within a respective one of said chambers while its other end is deformed against one of said bearings of said motor casing securing means.

REYNOLD HAPPE.

REFERENCES CITED

The following references are of record in the file of this patent:

UNITED STATES PATENTS

| Number | Name | Date |
|---|---|---|
| 2,026,261 | Vigne | Dec. 31, 1935 |
| 2,241,073 | Staak | May 6, 1941 |
| 2,294,713 | Boeger | Sept. 1, 1942 |
| 2,478,551 | Turner | Aug. 9, 1949 |

FOREIGN PATENTS

| Number | Country | Date |
|---|---|---|
| 12,514 | Great Britain | of 1897 |